(12) United States Patent
Rolfe (10) Patent No.: US 7,461,258 B2
(45) Date of Patent: *Dec. 2, 2008

(54) USE OF PUBLIC SWITCHED TELEPHONE NETWORK FOR CAPTURING ELECTRONIC SIGNATURES IN ON-LINE TRANSACTIONS

(75) Inventor: Andrew R. Rolfe, East Dundee, IL (US)

(73) Assignee: Authentify, Inc., Chicago, IL (US)

( * ) Notice: Subject to any disclaimer, the term of this patent is extended or adjusted under 35 U.S.C. 154(b) by 420 days.

This patent is subject to a terminal disclaimer.

(21) Appl. No.: 10/714,314

(22) Filed: Nov. 14, 2003

(65) Prior Publication Data

US 2004/0153655 A1    Aug. 5, 2004

Related U.S. Application Data

(63) Continuation-in-part of application No. 10/155,821, filed on May 24, 2002.

(51) Int. Cl.
G06F 21/00 (2006.01)
H04M 1/665 (2006.01)
H04L 9/00 (2006.01)

(52) U.S. Cl. .................. 713/176; 726/5; 379/142.05

(58) Field of Classification Search ................ None
See application file for complete search history.

(56) References Cited

U.S. PATENT DOCUMENTS

| | | | | |
|---|---|---|---|---|
| 5,303,285 A * | 4/1994 | Kerihuel et al. | ............. | 455/461 |
| 5,595,606 A | 11/1999 | Civanlar et al. | ............. | 379/201 |
| 6,012,144 A | 1/2000 | Pickett | ............. | 713/201 |
| 6,044,471 A | 3/2000 | Colvin | ............. | 713/202 |
| 6,088,683 A | 7/2000 | Jalili | ............. | 705/26 |
| 6,092,192 A | 7/2000 | Kanevsky et al. | ............. | 713/186 |
| 6,167,518 A | 12/2000 | Padgett et al. | ............. | 713/186 |
| 6,175,626 B1 | 1/2001 | Aucsmith et al. | ............. | 380/30 |
| 6,311,190 B1 | 10/2001 | Bayer et al. | ............. | 707/104 |
| 6,574,599 B1 | 6/2003 | Lim et al. | ............. | 704/270 |
| 6,934,858 B2 * | 8/2005 | Woodhill | ............. | 726/5 |
| 7,140,036 B2 | 11/2006 | Bhagavatula | | |
| 7,213,005 B2 * | 5/2007 | Mourad et al. | ............. | 705/64 |
| 2001/0027384 A1 * | 10/2001 | Schulze et al. | ............. | 702/188 |
| 2001/0037454 A1 | 11/2001 | Botti et al. | | |

(Continued)

FOREIGN PATENT DOCUMENTS

DE    197 18 103 A1    6/1998

(Continued)

OTHER PUBLICATIONS

PCT International Search Report, Sep. 14, 2006, 4 pages.

(Continued)

*Primary Examiner*—Christopher A Revak
(74) *Attorney, Agent, or Firm*—Husch Blackwell Sanders Welsh & Katz (57) ABSTRACT

A system for obtaining a digital signature incorporates two communication channels, and at least one of third-party data sources, geographic correlation algorithms, speech recognition algorithms, voice biometric comparison algorithms, and mechanisms to convert textual data into speech. A site visitor's identity can be verified using one or all of such features in combination with a visitors address on one of the channels.

10 Claims, 5 Drawing Sheets

U.S. PATENT DOCUMENTS

| | | | |
|---|---|---|---|
| 2002/0004831 A1 | 1/2002 | Woodhill | 709/229 |
| 2002/0128844 A1 | 9/2002 | Wilson et al. | |
| 2003/0074557 A1* | 4/2003 | Vatanen | 713/168 |
| 2003/0097339 A1* | 5/2003 | Funck et al. | 705/64 |

FOREIGN PATENT DOCUMENTS

| | | |
|---|---|---|
| EP | 0 444 351 A2 | 9/1991 |
| EP | 0 862 104 A2 | 9/1998 |
| WO | WO 97/31306 | 8/1997 |
| WO | WO 02/17539 | 2/2002 |
| WO | WO-02/21258 A1 | 3/2002 |

OTHER PUBLICATIONS

PCT Written Opinion of the International Searching Authority, Sep. 14, 2006, 6 pages.

Supplementary European Search Report; App. No. 00988057.6-1245 PCT/US0033812 (Feb. 23, 2007), 3 pages.

Supplementary European Search Report for EP Application No. 04821351.6 and PCT/US2004/038579 mailed Feb. 5, 2007.

* cited by examiner

Figure 1

Redirect Model
Figure 2A

Server - to - Server Model
Figure 2B

Figure 3

Figure 4

USE OF PUBLIC SWITCHED TELEPHONE NETWORK FOR CAPTURING ELECTRONIC SIGNATURES IN ON-LINE TRANSACTIONS

REFERENCE

This application is a continuation-in-part of U.S. patent application, Use of Public Switched Telephone Network for Authentication and Authorization in On-Line Transactions, application Ser. No. 10/155,821 filed May 24, 2002.

FIELD OF THE INVENTION

The invention pertains to automated on-line authentication and authorization systems. More particularly, the invention pertains to such systems, which incorporate speech processing.

BACKGROUND OF THE INVENTION

The Internet offers the prospect of expanded, world-wide commerce, e-commerce, with potentially lower cost to purchasers than heretofore possible. However, the lack of direct person-to-person contact has created its own set of problems. Identity theft is a problem threatening the growth of e-commerce.

E-commerce growth will only occur if there is a trusted and reliable security infrastructure in place. It is imperative that the identity of site visitors be verified before granting them access to any online application that requires trust and security. According to the National Fraud Center, its study of identity theft "led it to the inescapable conclusion that the only realistic broad-based solution to identity theft is through authentication." Identity Theft: Authentication As A Solution, page 10, nationalfraud.com.

In order to "authenticate" an entity, one must:
1. identify the entity as a "known" entity;
2. verify that the identity being asserted by the entity is its true identity; and,
3. provide an audit trail, which memorializes the reasons for trusting the identity of the entity.

In the physical world, much of the perceived security of systems relies on physical presence. Traditionally, in order to open a bank account, an applicant must physically appear at a bank branch, assert an identity, fill out forms, provide signatures on signature cards, etc. It is customary for the bank to request of the applicant that they provide one or more forms of identification. This is the bank's way of verifying the applicant's asserted identity. If the bank accepts, for instance, a driver's license in accepting as a form of identification, then the bank is actually relying on the processing integrity of the systems of the state agency that issued the driver's license that the applicant is who he/she has asserted themselves to be.

The audit trail that the bank maintains includes all of the forms that may have been filled out (including signature cards), copies of important documents (such as the driver's license), and perhaps a photo taken for identification purposes. This process highlights the reliance that a trusted identification and authentication process has on physical presence.

In the electronic world, the scenario would be much different. An applicant would appear at the registration web site for the bank, enter information asserting an identity and click a button to continue the process. With this type of registration, the only audit trail the bank would have is that an entity from a certain IP address appeared at the web site and entered certain information. The entity may actually have been an automated device. The IP address that initiated the transaction is most likely a dynamically-assigned address that was issued from a pool of available addresses. In short, the bank really has no assurance of the true identity of the entity that registered for the account.

To resolve this issue, many providers of electronic commerce sites have begun to rely on mechanisms that do not happen as part of the actual electronic transaction to help provide assurance that the transaction is authentic. These mechanisms are generally referred to as "out-of-band" mechanisms. The most frequently used out-of-band authentication mechanism is sending the end user a piece of mail via the United States Postal Service or other similar delivery services. The piece of mail sent to the end user will contain some piece of information that the site requires the end user to possess before proceeding with the registration.

By sending something (e.g., a PIN number) through the mail, and then requiring the end user to utilize that piece of information to "continue" on the web site, the provider of the site is relying on the deterrent effects of being forced to receive a piece of mail at a location, including but not limited to, the federal laws that are intended to prevent mail fraud. The primary drawback of using the mail is that it is slow. In addition, there is no audit trail. In this day and age of the Internet, waiting "7-10 days" for a mail package to arrive is not ideal for the consumer or the e-commerce site.

An authentication factor is anything that can be used to verify that someone is who he or she purports to be. Authentication factors are generally grouped into three general categories: something you know, something you have, and something you are.

A "something you know" is a piece of information which alone, or taken in combination with other pieces of information, should be known only by the entity in question or those whom the entity in question should trust. Examples are a password, mother's maiden name, account number, PIN, etc. This type of authentication factor is also referred to as a "shared secret".

A shared secret is only effective if it is maintained in a confidential fashion. Unfortunately, shared secrets are often too easy to determine. First, the shared secret is too often derived from information that is relatively broadly available (Social Security Number, account number). Second, it is difficult for a human being to maintain a secret that someone else really wants. If someone really wants information from you, they may go to great lengths to get it, either by asking you or those around you, directly or indirectly, or by determining the information from others that may know it.

A "something you have" is any physical token which supports the premise of an entity's identity. Examples are keys, swipe cards, and smart cards. Physical tokens generally require some out-of-band mechanism to actually deliver the token. Usually, some type of physical presence is necessary (e.g., an employee appearing in the human resources office to pick up and sign for keys to the building.)

Physical tokens provide the added benefit of not being "socially engineer-able", meaning that without the physical token, any amount of information known to a disreputable party is of no use without the token. A trusted party must issue the token in a trusted manner.

A "something you are" is some feature of a person that can be measured and used to uniquely identify an individual within a population. Examples are fingerprints, retina patterns, and voiceprints. Biometric capabilities offer the greatest form of identity authentication available. They require some type of physical presence and they are able to depict unique characteristics of a person that are exceedingly difficult to spoof.

Unfortunately, capturing a biometric requires specific hardware at the users location, and some of the hardware to support biometrics is expensive and not yet broadly deployed. Some biometric technology in use today also relies on an electronic "image" of the biometric to compare against. If this electronic image is ever compromised, then the use of that biometric as identity becomes compromised. This becomes a serious problem based on the limited number of biometrics available today. More importantly, biometrics cannot be utilized to determine an individual's identity in the first instance.

A security infrastructure is only as strong as its underlying trust model. For example, a security infrastructure premised upon security credentials can only address the problems of fraud and identity theft if the security credentials are initially distributed to the correct persons.

First-time registration and the initial issuance of security credentials, therefore, are the crux of any security infrastructure; without a trusted tool for initially verifying identity, a security infrastructure completely fails. The National Fraud Center explicitly noted this problem at page 9 of its report:

"There are various levels of security used to protect the identities of the [security credential] owners. However, the known security limitation is the process utilized to determine that the person obtaining the [security credential] is truly that person. The only known means of making this determination is through the process of authentication."

In any security model, the distribution of security credentials faces the same problem: how to verify a person's identity over the anonymous Internet. There are three known methods for attempting to verify a site visitor's identity. The three current methods are summarized below:

Solution A: An organization requires the physical presence of a user for authentication. While the user is present, a physical biometric could be collected for later use (fingerprint, voice sample, etc.). The problem with the physical presence model is that it is extremely difficult and costly for a company to require that all of its employees, partners, and customers present themselves physically in order to receive an electronic security credential. This model gets more difficult and more expensive as it scales to a large number of users.

Solution B: A company identifies and authenticates an individual based on a shared secret that the two parties have previously agreed upon. The problem with the shared secret model is that it in itself creates a serious security problem: shared secrets can easily be compromised. Since the shared secret is relatively easy to obtain, this security model suffers from serious fraud rates. Use of an electronic copy of a specific biometric like a thumbprint could be used as a shared secret. But once it is compromised, one cannot reissue a new thumbprint and there is a limited set of others to choose from.

Solution C: A company relies on communication of a shared secret through the postal service. This process begins when the user registers at a web site and enters uniquely identifying information. A personal identification number (PIN) is then sent to the user at a postal mailing address (assuming the identifying information is correct). The user must receive the PIN in the mail, return to the web site and re-register to enter the PIN. The postal service is used because it is a trusted network; there is some assurance of delivery to the expected party and there are legal implications for breach of the network. A large flaw with this method is the built-in delay of days, even weeks, before the user receives the PIN. This mode of authentication is too slow by today's business standards; the potential of the Internet to transform the structure of commerce rests firmly on the ability to process transactions rapidly. Too many people simply never finish the process. Moreover, there is a limited audit trail to refer to in the event of a dispute regarding the use of the security credential. A signature (another type of biometric) could be required, but that triples the delay until the PIN is returned. Organizations are seeing large number of potential customers not returning to close a transaction after these delays.

Table 1 summarizes characteristics of the known authentication processes.

TABLE I

| Characteristics | Authentication Processes | | |
| --- | --- | --- | --- |
| | Physical Presence | Mail | Shared Secrets |
| Automated | | | ✓ |
| Easily Scalable | | ✓ | ✓ |
| Auditable | ✓ | ✓ | |
| Can use biometrics | ✓ | | |
| Has legal protections | ✓ | ✓ | |
| Occurs in real time, therefore tends to retain customers | | | ✓ |
| Deters fraud | ✓ | ✓ | |
| Protects private data | ✓ | | |

Known solutions do not enable organizations to distribute efficiently and securely electronic security credentials. There continues to be a need for improved authentication or authorizing methods. Preferably such improvements could be realized without creating substantial additional complexity for a visitor to a site. It would also be preferable if such methods did not slow down the pace of the interaction or transaction. One known system has been disclosed in U.S. application Ser. No. 2002/0004831A1 published Jan. 10, 2002 and entitled System and Method of Using The Public Switched Telephone Network In Providing Authentication or Authorization For Online Transactions, assigned to the assignee hereof and incorporated herein by reference.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Embodiments of the present system and method exhibit characteristics which include:

1. Use of two communications channels, different at least in part. The process is facilitated where the user has access to a telephone (for example, a device identified on one of the channels, such as a voice channel). This can provide a basic form of identity verification;
2. Ability to input to the system over one of the channels a random, real-time generated confirmation number delivered over the other channel is used as a verification of the individual's access to both channels. Speech recognition software can be used if the number is input via the voice channel;
3. Data collected about the person, the communication channels and their identifiers is compared to stored or third-party data about the person or the communication channels. Similarities in this data can be used as another form of verification;
4. The ability of the person to recite or somehow enter into one or both of the communication channels a shared secret that should only be known by the identity being verified is another form of identity verification. Speech recognition software can be used if the shared secret is input via the voice channel;
5. Speech recognition software can be used to ensure that a voice recording taken during the session is of known content (e.g. the confirmation number) and of good quality. This voice recording can be used as part of the audit trail and for voice biometric comparison (see #6 below); and
6. A voice print can be collected for this individual, during a registration session using the above authentication techniques, or via some other means. This previously stored voice print can be used subsequently as another form of identity verification by using voice biometric software to compare the voice print to the voice recording mentioned above in #5.

Figure 1:
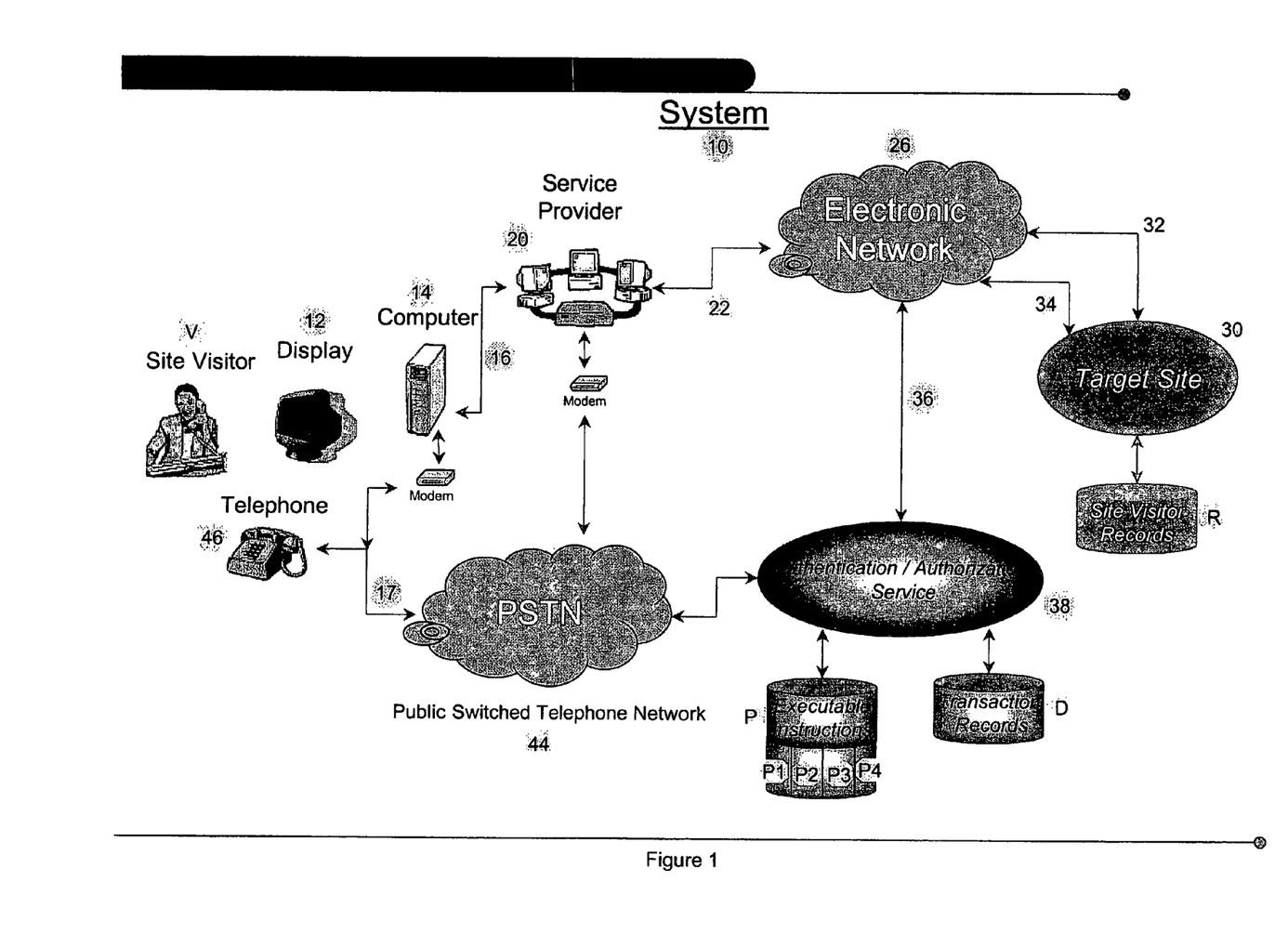
FIG. 1 is a block diagram of a system in accordance with the present invention.

FIG. 1 illustrates a system 10 for carrying out an interactive, authentication/authorization process. In one aspect, system 10 as discussed below can be implemented using multiple communication lines, one for voice and one for data. Alternately, a single line (the telephone line) can be shared between voice communication use and data communication use.

The system 10 includes a site visitor's display 12 and associated local computer 14. The site visitor V, via a bidirectional communication link 16 can access, forward requests to and receive services from an Internet service provider 20. Alternatively, if a separate communication line 16 is not available, the telephone line 17 can be shared between voice communication using the telephone 46 and data communication using modems. The Internet service provider 20 which would be coupled via bi-directional communication links 22 communicates via an electronic network 26, which could be the publicly available Internet or a private Intranet, with a target site 30 via a bi-directional communication link 32.

In a typical transaction, the visitor V logs onto target site 30 and requests, authorization, authentication or other services alone or in combination from the site 30. In response to one or more requests from the visitor V, the site 30, via a bi-directional communication link 34 and the network 26 communicates via another link 36 with an authentication/authorization server 38.

Server 38 includes authorization/authentication software in the form of prestored executable instructions P. It also includes databases D wherein information is stored in connection with prior transactions, or previously supplied information provided by target site 30.

The authentication/authorization server 38 makes it possible to authenticate or authorize the site visitor V in accordance with the present invention. The server 38 receives either from target site 30 or directly from visitor V a telephone number where the visitor V can be called or reached essentially immediately via an automated call from server 38.

To strengthen the trust in the telephone number being used for the automated phone call, executable instructions P-1 search for the phone number within third-party databases in real-time. These databases can be local to site 38, or can be remote and accessed via network 26. Information associated with the subject phone number can be returned to site 38 for analysis. That data may also be returned to the requesting site 30 for further verification that this phone number belongs to (and is therefore being answered by) the person whose identity is being verified, the Site visitor V. The data can be processed in various ways:

i. Returned to the Target Site

Any data found associated with the phone number can be returned to the site 30 within the transaction.

ii. Name and Address Validation

The site 30 can provide name and address data, collected from visitor V or from the site's existing database of information, to server 38. This information will be compared to name and address information server 38 finds associated with the phone number. The comparison (match or no match) can be returned to site 30 for each field of the data provided. Since the application can be customized to the Target Site's requirements, any comparison algorithm can be applied. Some examples are:

Exact character for character match

First letter match (for initial)

Nick name match (e.g. Bob matches Robert)

Partial match (e.g. Mary-Anne partially matches Mary)

iii. Geographic Correlation

A postal code provided by the site 30 can be compared to the telephone number. This can be done, for example, by calculating the distance from the geographic location of the centroid of the two dimensional area represented by the zip code, to the geographic location of the central office (PSTN switching station) serving as the last switching point for a call placed to the telephone number. Using this distance, the site 30 can make policy decisions based on how close the phone number must be to the address known for the visitor V. For example, the visitor V could be using a home phone for a business transaction late at night. The site 30 could have a policy to mark the transaction suspect if the distance is more than what the site 30 deems reasonable for the maximum commute from a person's home to work.

In addition to accepting data input from the visitor V via the telephone keypad, system 10 can also accept spoken input using commercially available speech recognition software P-2. From a security prospective, software P-2 strengthens the use of voice recordings for the audit trail.

With speech recognition, the system 10 can ensure that the voice recordings are clear and recognizable. For example, site 38 could require the visitor V to recite the phone number dialed, one digit at a time. Since the site 30 knows the phone number, using speech recognition during the recording enables it to verify that the visitor V has clearly and correctly spoken the number, ensuring a high quality voice recording. Therefore these recordings can be more highly trusted for subsequent human review or automated voice biometric comparisons.

System 10 can incorporate commercially available software P-3 to convert text data to speech at the time of the transaction. This enables the system, via site 38, to deliver electronic security credentials audibly via the telephone in addition to, or instead of visually via the web pages. This could be useful for applications that are required to deliver security information (like a randomly generated temporary access password) via an out-of-band network other than the Internet. This is also useful when the audible instructions for the site visitor V cannot be determined before the phone call is made. For example, the system 10 could cause random verification data to be spoken via annunciation software P-3 to practically eliminate the ability for a person to attempt to pre-record answers using someone else's voice.

The voice recordings taken during the registration process can be used to determine the voice biometrics of the visitor V (at the tine of acquisition or at a later date). The system 10 includes commercially available voice biometric software P-4 to analyze a good quality voice recording and create a "voice print" (or voice biometric), similar to a fingerprint or a written signature. It is a digital representation of the unique characteristics of the users voice and vocal tract. Using this voice biometric, the system 10 can use commercially available software to compare one voice with another. This allows the system to determine (within the accuracy of the voice biometric tools) if the voice of the visitor V is the same as that of the person who had previously used the system.

The first time the visitor V uses the system 10, two factors of authentication are used:
1. the ability of that person to answer a phone call at their own phone number ("something you have")
2. and knowledge of a shared secret ("something you know").

Once the voice biometric has been captured, in each subsequent use of the system a third factor of biometric authentication ("something you are") can be added to the previously described two factors. This significantly increases the strength of the authentication or authorization decision made based on this information.

The system employs two different (at least in part) communication links to reach the site visitor. The embodiments described herein use the Internet as the data communication link and the PSTN as the voice communication link. Each of the communication links has their own method of identifying the specific device being used by the site visitor. The embodiments described herein use IP address as the addressing method for the data communication device (e.g. the site visitor's computer), and use the public telephone number as the addressing method for the voice communication device (e.g. the site visitor's telephone).

Preferably, in a system implemented in accordance herewith (i) the communication links have a separate, independently verifiable addressing method, (ii) at least one of the communication links supports voice communication between the site visitor and the authentication/authorization site, and (iii) the security of both links is trusted by both the target and authentication/authorization sites. The links may even share some portion of a physical connections between devices (as discussed with regard to single versus multiple communication lines located at the site visitor's location).

Various voting-type products can be created based on the above described system and functionality.

A typical on-line voting application today is exercising shareholder proxy voting rights. These voting applications typically require the use of a Personal Identification Number (PIN) that is sent via the postal mail to the street address on record for the stockholder(s). After receiving the PIN, any one of the members of that household can go to a website, where the PIN is used as the sole identification of the stock rights being voted.

System 10 could be used to deliver the PIN verbally via a phone call, instead of using the postal mail. Instead of mailing a printed letter, system 10 could call the stockholder(s) at a known telephone number(s) and deliver the PIN via text-to-speech. This increases the security by providing an audit trail as to whom the PIN was actually delivered (the phone number used and the voice recording of the person who accepted the delivery), as well as being less costly than the more manual process of mailing printed materials. The PIN can then be used in a known fashion to carry out the voting process.

However, voting in a Federal or State election requires much more security than simply mailing a PIN to a postal address. The typical manual systems in use today use a two-step process. First, a person must register to vote. This is usually done by requiring a person's physical presence at a State or Federal agency so that agency personnel may check records to verify that the individual is a resident, not previously registered, not listed as deceased, and other similar checks. At the time of registration, the authority captures the person's signature. The second stage takes place at the polls.

Each time a person exercises a right to vote, poll officials authenticate prospective voters by manual comparison of the signature on record with a signature executed before them. They may also require the person to possess a voter registration card or some other type of trusted credential (e.g. a drivers license).

System 10 could be used to fully automate the process. The process would require the capture of a voice biometric during voter registration (instead of a signature). This registration could still require physical presence, or could be done remotely using system 10. The requirement would be that at least two forms of authentication take place (e.g. shared secret and access to your home phone), and a good quality voice recording be captured. That trusted voice recording would then be used to create a voice biometric specific for that voter (similar to their written signature).

Once a person has registered to vote, he or she would simply go to a web site to place their vote. At that web site, they would be asked for a phone number where they can be reached at that moment (or the system could require them to be at a known, trusted phone number that is on record for that voter).

The system 10 would use previously discussed software P-1 for telephone data lookup to obtain information about the owner of that phone and it's approximate location. At the same time, a phone call would be placed to that number. When the voter answered the phone, he or she would be requested to speak a shared secret (for example something similar to the manual check of a voter ID number, or a driver's license number). While the voter is speaking the shared secret, the system will be comparing the voice with the previously created voice biometric data. Now the system has:

The phone number called

The phone number's owner and location information

The spoken shared secret

Voice recording(s) of the voter

And a biometric comparison against the voice used during registration

Using all this data, the system 10 can apply whatever rules the vote conducting authority wishes to enforce relative to authentication of the voter. This process can be even more secure than the manual process, because:

The system is fully automated so there is no chance of collusion

The audit trail can be re-verified later if there is a dispute

It is also more effective than the manual process since it does not require the physical presence of the voter to cast his or her vote. This system can thus be used in absentee ballot situations.

Figure 2A:
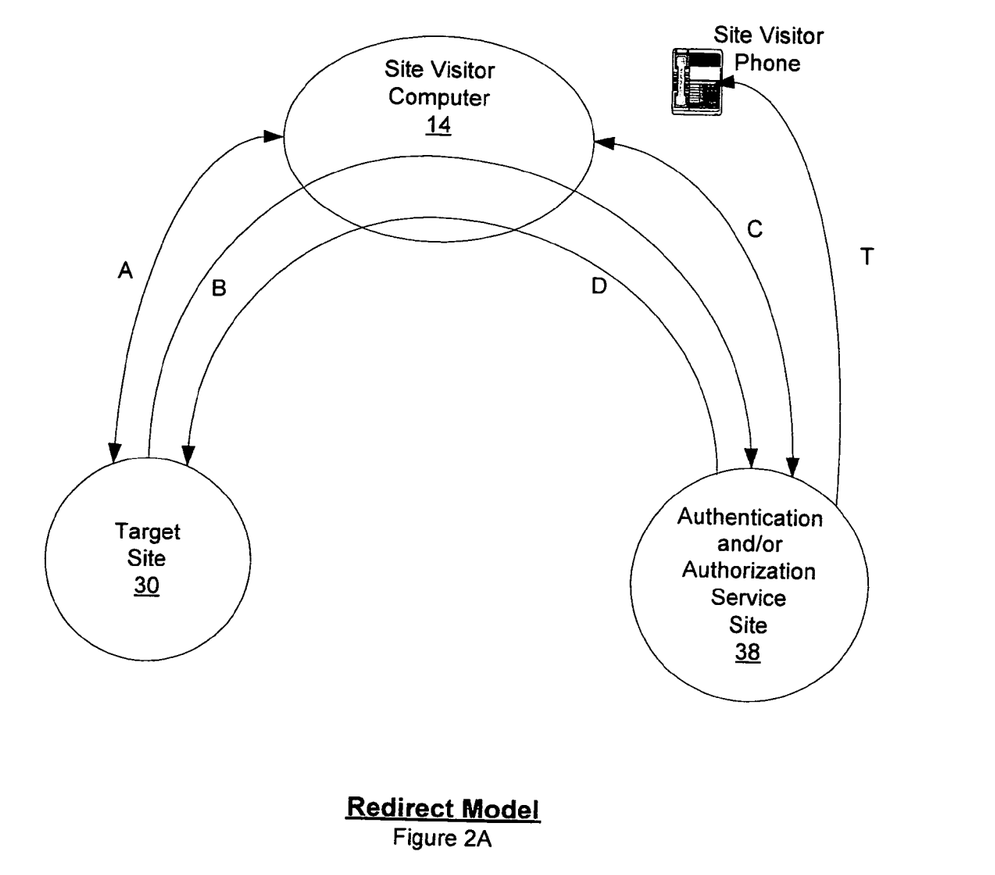
FIG. 2A illustrates a flow of interactions between components of a "redirect model" system and method in accordance with the invention.

The Table II-A and the FIG. 2A illustrate the use of the System 10 in a way that has the service site 38 directly interact with the visitor V. The visitor V is redirected from interacting directly with the target site 30, to interacting directly with the authentication & authorization service site 38 prior to placing the phone call. When the phone call is complete the visitor is redirected back to the target site. This model is called the "redirect model". The redirect model is typically used when the target site wishes to off-load as much processing as possible.

Figure 2B:
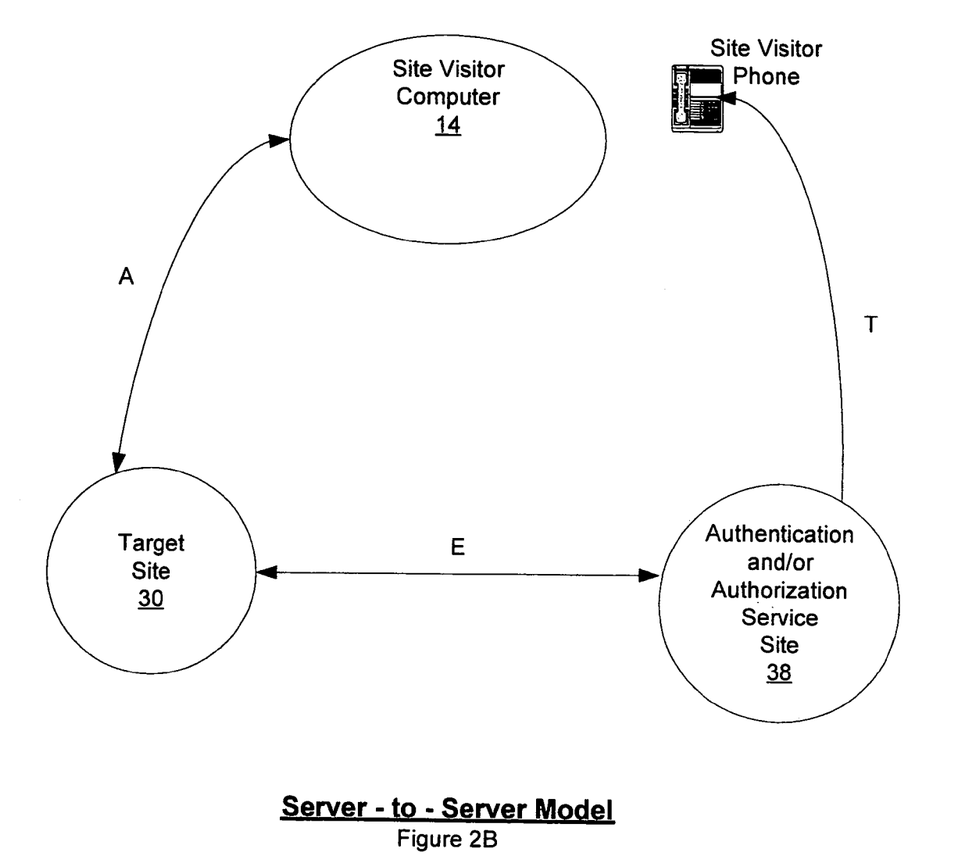
FIG. 2B illustrates a flow of interactions between components of a "server to server model" system and method in accordance with the invention.

The Table II-B and the FIG. 2B illustrate the use of the System 10 in a way that has the service site 38 interact only with the target site 30. The visitor V only interacts directly with the target site 30. The target site uses the authentication & authorization service site 38 as a service provider. This model is called the "server-to-server model". The server-to-server model has no requirements of the type or method of interaction with the site visitor. The visitor could be interacting with the target site using the Internet, or the visitor could be interacting with the target site indirectly, such as interacting with a clerk at a store, who is using a point of sale terminal, which in turn is communicating with the target site.

TABLE II-A

| FIG. 2A | Interaction | Responsible site |
|---|---|---|
| A | Site visitor initiates activity that requires authentication or authorization | Target site (30) |
| A | Determine phone number to use | Target site (30) |
| A | Gather any additional data from site visitor | Target site (30) |
| B | Redirect site visitor to the Service site with data | Target site (30) |
| C | Determine if site visitor has single or multiple communication lines | Service site (38) |
| T | Place phone call to site visitor | Service site (38) |
| C | Prompt user with random number to be entered via telephone | Service site (38) |
| C | Possible phone call progress (busy, etc.) | Service site (38) |
| D | Redirect site visitor back to Target site with session completion status and data | Service site (38) |
| A | Conclusion: Successful = deliver credential Failure = error messages | Target site (30) |

TABLE II-B

| FIG. 2B | Interaction | Responsible site |
|---|---|---|
| A | Site visitor initiates activity that requires authentication or authorization | Target site (30) |
| A | Determine phone number to use | Target site (30) |
| A | Gather any additional data from site visitor | Target site (30) |
| A | Determine if site visitor has single or multiple communication lines | Target site (30) |
| E | Send request directly to Service site with data | Traget site (30) |

TABLE II-B-continued

| FIG. 2B | Interaction | Responsible site |
|---|---|---|
| A | Prompt user with random number to be entered via telephone | Traget site (30) |
| T | Place phone call to site visitor | Service site (38) |
| E | Query Service site for possible phone call progress (busy, etc.) and display to site visitor | Traget site (30) |
| E | Send Target site session completion status with data | Service site (38) |
| A | Conclusion: Successful = deliver credential Failure = error messages | Target site (30) |

Figure 3:
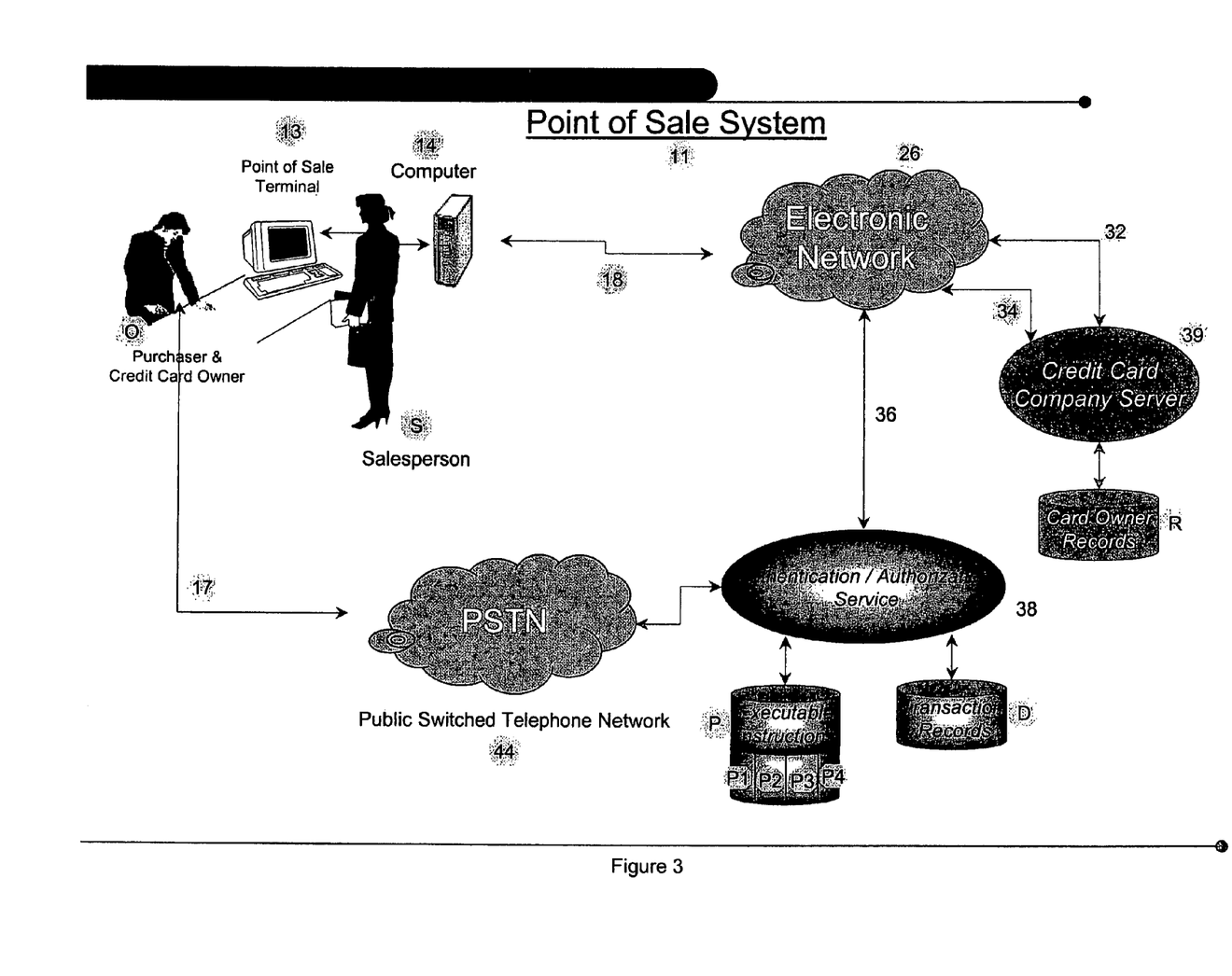
FIG. 3 illustrates a particular application of the "server-to-server model" system and method in accordance with the invention.

FIG. 3 illustrates an application of the "server-to-server model" system and method in accordance with the invention. A point of sale system 11 uses the authentication/authorization service 38 to authorize the use by a purchaser O of a credit card for a high value transaction with a salesperson S.

The salesperson enters the purchase request and the credit card number into the point of sale terminal 13, which communicates the request to the selling company's computer 14'. The computer 14' requests approval for the use of the credit card from the credit card issuing company's computer 39 over data communications links 18 and 32 via an electronic network 26.

The credit card company determines from its records R that the owner of the card wishes to be contacted for authorization of any purchase over a certain value. Since this is a high value transaction, this triggers a server-to-server request to the authentication/authorization service site 38 over data communication links 34 and 36 via an electronic network 26. The request to service site 38 contains at least a phone number for the credit card owner (from records R), and the value of the transaction.

Upon receiving the request, the service site 38 executes specific prestored instructions P to place a phone call to the phone number provided (in this case the card owner's mobile phone) via the telephone network 44 and voice communication link 17. Several phone numbers could be provided and the system could attempt to contact the owner using each one sequentially.

When the card owner O answers the mobile phone, the service site informs the owner "You have requested a telephone call to approve any high value transaction using your credit card. Please press # to accept this call". The owner presses # on the mobile phone to accept the call and the service site responds by dynamically generating a voice request using annunciation software P-3 to inform the owner of the specific value of the transaction: The speech requests the owner to say, "I approve the two thousand dollar purchase" to approve the purchase. The owner speaks the words and the speech recognition software P-2 validates that the owner has approved the transaction.

After giving voice feedback of the recognition to the owner, the phone call is terminated by the service site. The service site saves the voice recording and all other information regarding the authorization within transaction records D for future auditing purposes.

The authorization results are communicated back to the credit card company's computer 39, which communicates the purchase approval back to the selling company's computer 14, and the salesperson 13.

If required by the credit card company, voice biometric verification software P-4 could be used to compare the voice of the owner speaking the approval with the voice print of the owner within the credit card company's records R. This would require the authorization request sent to the service site 38 to include either the voice print itself, or a voice print identifier, which would be used to locate the actual voice print within data records D.

In summary, this authentication and/or authorization system, uses a site visitor's ability to have physical access to answer a specific telephone number as one factor of authentication of that site visitor (a "something you have"). In addition, it incorporates one or more of:

A. Provides random data via one of the communication links to the site visitor, which must be immediately (when using multiple communication lines), or within a very limited amount of time (when using only one communication line) be input into the other communication line by the site visitor and validated by the system to ensure the same person is using both devices at that time.

B. Uses third-party data to validate location and/or ownership of the device represented by the identifier used to access said device (e.g. the billing address of a telephone number or the person or company that registered for a specific IP address).

C. Looks for correlations between the data related to each of the two communication links.

D. Records details about both communication sessions (e.g. time and date, device identifier (telephone number, IP address of site visitor's computer), recordings of the site visitor's voice, etc.) and related third-party data associated with the device identifiers (as in B & C above) for subsequent audit purposes.

E. Verifies the site visitor's knowledge of a secret piece of data shared between the target site and the site visitor, and uses this verification as a second factor of authentication of the site visitor (a "something you know").

F. Verifies the voice of the site visitor using commercially available voice biometric comparison algorithms, and uses this verification as a third factor of authentication of the site visitor (a "something you are").

G. Delivers data to the site visitor via either one or both of the communication links (e.g. displays a partial password on the computer screen and/or speaks a partial password over the telephone).

Figure 4:
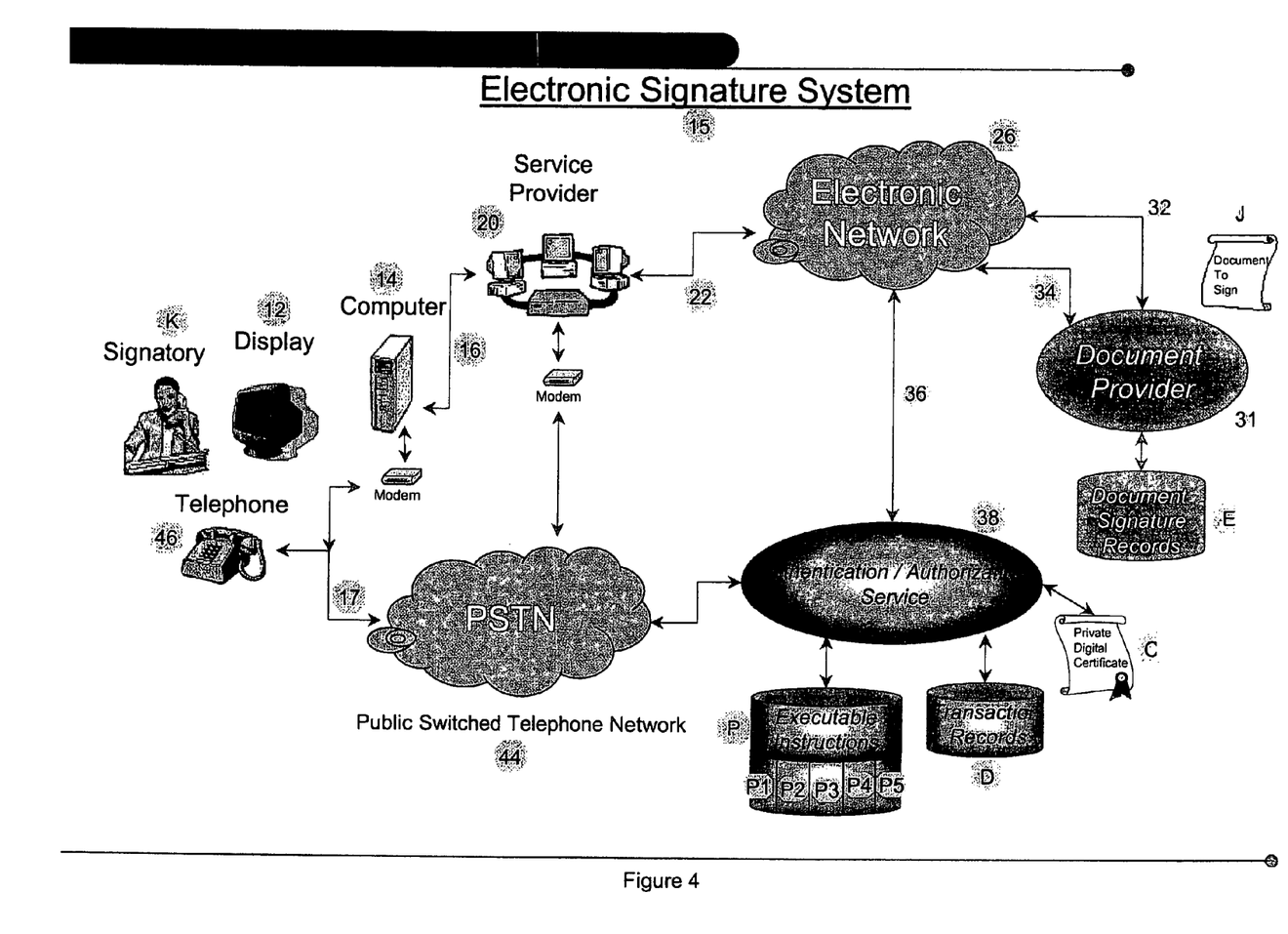
FIG. 4 illustrates another system and method in accordance with the invention.

FIG. 4 illustrates another system and method in accordance with the invention. The system of FIG. 4 is for the purpose of capturing electronic signatures of documents.

It will be understood that "documents" includes all forms of agreements, contracts or any other type of documents of commercial or legal significance. The exact nature of the document in question is not a limitation of the invention.

A document provider 31 in this instance is any entity that wishes to present some form of document to a signatory and obtain his/her signature electronically. The document provider 31 uses the authentication/authorization service 38 to capture an electronic signature and optionally authenticate the signatory K.

A potential signatory K connects to the document provider 31 via an electronic network 26. The document provider 31 presents the signatory K with a copy of the document J to be signed using his/her computer 14, display 12, via the electronic network 26 and intermediary data communication links 16, 22 and 32.

In one scenario, the signatory K reads and reviews the document J and agrees to sign it as is. If changes are required to satisfy both parties they can be arrived at using any process convenient for the parties. As an alternate embodiment of this model, the document could be presented by voice over the public switched telephone network 44.

Once the signatory K agrees to sign the document J, a unique document identifier (for example a one-way hash) using standard cryptographic algorithms, as would be understood by those of skill in the art, is computed from the document together with other pertinent information about the signature transaction (such as date, time, and signatory identifier).

The unique document identifier is presented to the signatory K via his/her computer 14 and display 12 over the electronic network 26, or alternatively by voice over the PSTN 44. This unique document identifier and all associated information including the document are then stored in the document signature records E of the document provider 31 for future reference.

The document provider 31 then sends a request to the authentication/authorization service site 38 over data communication links 34 and 36 via an electronic network 26. The request to service site 38 includes at least a phone number for the signatory K (obtained from the document provider's records or from the signatory themselves as part of this transaction), the unique document identifier for the document and associated information.

Upon receiving the request, the service site 38 executes prestored instructions P to place a phone call to the provided phone number via the telephone network 44 and voice communication link 17. Various prompts can be provided during this phone call as would be understood by those of skill in the art. The following sequence is exemplary only and is not a limitation of the invention.

When the signatory K answers the phone, the service site 38 informs the signatory K that: "This call is being recorded. You have requested a telephone call to electronically sign a document. Please press # to agree to the recording and to accept this call".

The signatory K presses # on the phone to accept the call and the service site 38 responds by prompting the signatory to attest that he/she has read and agrees to the terms and conditions of document J as presented. The speech from site 38 requests the signatory K to verbalize an intent to be legally bound by document J, such as, "I have read and agree to the document as presented".

Once the signatory K speaks the words, the speech recognition software P-2 validates that the signatory K has spoken the appropriate words. Then the service site 38 prompts the signatory K to recite the unique document identifier that was previously provided during the review of the document. The signatory K speaks the identifier and the speech recognition software P-2 validates that the signatory has accurately spoken the identifier. This unique document identifier then connects the document J and all associated information used to compute the identifier, with the voice attestation.

Those of skill in the art will understand that neither the above exemplary message(s) to signatory K nor the specific exemplary fashion in which signatory K responds are limitations of the invention. Other messages or prompts come within the spirit and scope of the invention.

After providing voice feedback of the recognition to the signatory K, the phone call is terminated by the service site 38. Digital signature software P-5 at the service site 38 then computes a digital signature of the significant data associated with this transaction (which at a minimum can include the unique document identifier, the unique transaction identifier, the voice recordings, the date and time).

The digital signature is computed using standard cryptographic techniques of a type known to those of skill in the art. This process incorporates a private, unique digital certificate key C that has been preassigned to the authentication/authorization service site. The service site 38 can then save the voice recording and all other information regarding the voice transaction within transaction records D for future use as needed including auditing or enforcement.

The results, including the digital signature and unique transaction identifier can be communicated back to the document provider site 31. The document provider site 31 can then save the information including digital signature, the transaction identifier and the transaction results with the previously stored document signature records.

If the document provider has a previous relationship with the signatory, voice biometric verification software P-4 could be used to compare the voice of the signatory speaking the approval with a voice print of the signatory that was captured previously by the authentication/authorization service site and stored within the document providers records E. This would require the request sent to the service site 38 to include either the voice print itself, or a voice print identifier, which would be used to locate the actual voice print within data records D.

Subsequently, if the document provider wishes to verify that a specific signatory electronically signed a specific document, it can use the stored document signature records E. Verification that the document content has not changed can be accomplished by again computing a unique document identifier using the same standard cryptographic algorithms. This document identifier can then be compared to the identifier stored for the transaction to be verified.

The identity of the signatory can be verified either by audible review of the voice recordings stored for the transaction, or by the same biometric verification process used to authenticate the individual originally. The voice recordings are bound to the document since the signatory spoke the unique document identifier within the recordings. The integrity of the recordings and the other transactional information can be verified by verifying the digital signature of the transactional information using standard cryptographic practices.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method comprising:
   establishing two different electronic communications paths whereby a first path is established, and using information obtained thereby establishing an address to open the second path;
   verifying the identity of a party who has established the first path; presenting a requested document and a unique document identifier to the party via the first path first, seeking confirmation from the party that the document is acceptable, and, then in response thereto, audibly receiving from the party, via the second path, the unique document identifier.

2. A method as in claim 1 which includes creating a digital signature associated with the presented document.

3. A method as in claim 2 which includes comparing current audio responses from the party with previously received responses from the party.

4. A method as in claim 1 which includes interrogating at least one third-party database to evaluate the trustworthiness of the address.

5. A method as in claim 4 which includes evaluating the address with respect to selected mail delivery information associated with the party.

6. A method as in claim 4 which includes carrying out a geographical correlation between the address and other information associated with the party.

7. A system for capturing an electronic signature comprising:
   a telephone network-type communication system and a second communication system different, at least in part, from the telephone system;
   executable instructions enabling a user to communicate with a document provider and to receive, via the second system, a copy of a document to be signed;
   executable instructions enabling the document provider to generate a unique document identifier and to subsequently forward that identifier to the user via the second system;
   executable instructions enabling the user to be contacted, via the telephone system at a telephone number associated with the user, seeking confirmation from the user that wording of the document is acceptable, and, executable instructions, responsive to the user's confirmation that the received document is acceptable, which request that the user return the document identifier via the telephone system; and
   executable instructions that compare the document identifier forwarded to the user, via the second system, with that returned by the user, via the telephone system, and, responsive to a match therebetween, enabling the document provider to generate an electronic signature indicative thereof.

8. A system as in claim 7 which includes executable instructions, associated with the telephone system for storing voice related information received when the user verbally provides the document identifier via the telephone system.

9. A system as in claim 8 which includes speech recognition software.

10. A system as in claim 8 where the document provider stores document signature records.

* * * * *